United States Patent [19]
Laskaris et al.

[11] Patent Number: 5,257,915
[45] Date of Patent: Nov. 2, 1993

[54] OIL FREE LINEAR MOTOR COMPRESSOR

[75] Inventors: Evangelos T. Laskaris; Robert A. Ackermann, both of Schenectady, N.Y.

[73] Assignee: General Electric Company, Schenectady, N.Y.

[21] Appl. No.: 863,603

[22] Filed: Apr. 3, 1992

[51] Int. Cl.$^5$ ............... F04B 17/04; F04B 35/04
[52] U.S. Cl. ............................ 417/418; 417/415; 417/416; 417/417
[58] Field of Search ............... 417/418, 415, 416, 417; 310/15, 17

[56] References Cited

U.S. PATENT DOCUMENTS

| | | | |
|---|---|---|---|
| 4,799,421 | 1/1989 | Bremer et al. | 417/418 |
| 4,886,429 | 12/1989 | Osada et al. | 310/15 |
| 4,945,269 | 7/1990 | Kamm | 310/15 |
| 5,011,379 | 4/1991 | Hashimoto | 417/418 |

Primary Examiner—Richard A. Bertsch
Assistant Examiner—Alfred Basichas
Attorney, Agent, or Firm—James R. McDaniel; Paul R. Webb, II

[57] ABSTRACT

This invention relates to linear motor compressors which operate without the use of oil. Such structures of this type, generally, provide a highly reliable oil-free compressor for use with cryogenic refrigeration equipment so as to attain unattended, continuous operation without maintenance over extended periods of time.

18 Claims, 4 Drawing Sheets

OIL FREE LINEAR MOTOR COMPRESSOR

CROSS-REFERENCE TO A RELATED APPLICATION

This application is related to commonly assigned U.S. patent application Ser. Nos. 07/863,603, 07/862,688 and 07/862,693, respectively, to Ackermann et al., E. T. Laskaris and E. T. Laskaris, entitled, "Linear Compressor Dynamic Balancer", "Balanced Linear Motor Compressor" and "A Flexible Suspension For An Oil-Free Linear Motor Compressor".

BACKGROUND OF THE INVENTION

1. Field of the Invention

This invention relates to linear motor compressors which operate without the use of oil. Such structures of this type, generally, provide a highly reliable oil-free compressor for use with cryogenic refrigeration equipment so as to attain unattended, continuous operation without maintenance over extended periods of time.

2. Description of the Related Art

It is known in cryorefrigerator compressors, to employ petroleum-based oil as the lubricant. Typically, a petroleum-based oil dissolves gases such as air and hydrocarbon which come in contact with the gases over time. When the oil in the compressor interacts with the cooling gases pumped by the compressor into the cold head, the oil releases the air into the cooling gases. Thus, a portion of air dissolved into the oil is carried by the cooling gases into the cold head. When the cooling gases contact the cold head, which, typically is maintained at temperatures below 77K, the air condenses and solidifies on the cold head cold surfaces. The solidification of the air can adversely affect the cold head operation because it plugs up the regenerators, reduces the piston clearances and wears out the piston seals. Ultimately, the reduced capacity of the cold head can affect the overall performance of the cryorefrigerator. Therefore, a more advantageous compressor would be presented if the oil could be eliminated.

It is apparent from the above that there exists a need in the art for a compressor which is capable of being used with cryogenic refrigeration equipment and which, at least, equals the cooling characteristics of the known cryorefrigerator compressors, but which at the same time is oil-free so that the contamination and unreliability associated with cold heads employing oil lubricants are reduced. It is a purpose of this invention to fulfill this and other needs in the art in a manner more apparent to the skilled artisan once given the following disclosure.

SUMMARY OF THE INVENTION

Generally speaking, this invention fulfills these needs by providing an oil-free linear motor compressor, comprising a stator means, an inner core means substantially located within said stator means, a reciprocating driver coil means substantially located between said stator means and said inner core means, a compressor drive means located adjacent said inner core means and attached to said driver coil means, and a gas inlet and exhaust means substantially connected to said compressor drive means.

In certain preferred embodiment, the stator means houses a stationary epoxy-impregnated DC field coil and a reciprocating AC driver coil wound on a stainless steel coil form. Also, the compressor drive means includes thin walled pistons having a diaphragm valve and flexure springs. Finally, the gas inlet and exhaust means conducts helium gas which is used to activate the piston and provide a gas bearing for the piston.

In another further preferred embodiment, unattended, continuous operation of the compressor can be attained for long periods of time while reducing contamination of the cryorefrigerator cold head and increasing the reliability of the cold head.

The preferred compressor, according to this invention, offers the following advantages: easy assembly and repair; excellent compressor characteristics; good stability; improved durability; good economy; and high strength for safety. In fact, in many of the preferred embodiments, these factors of compressor characteristics and durability are optimized to an extent considerably higher than heretofore achieved in prior, known compressors.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
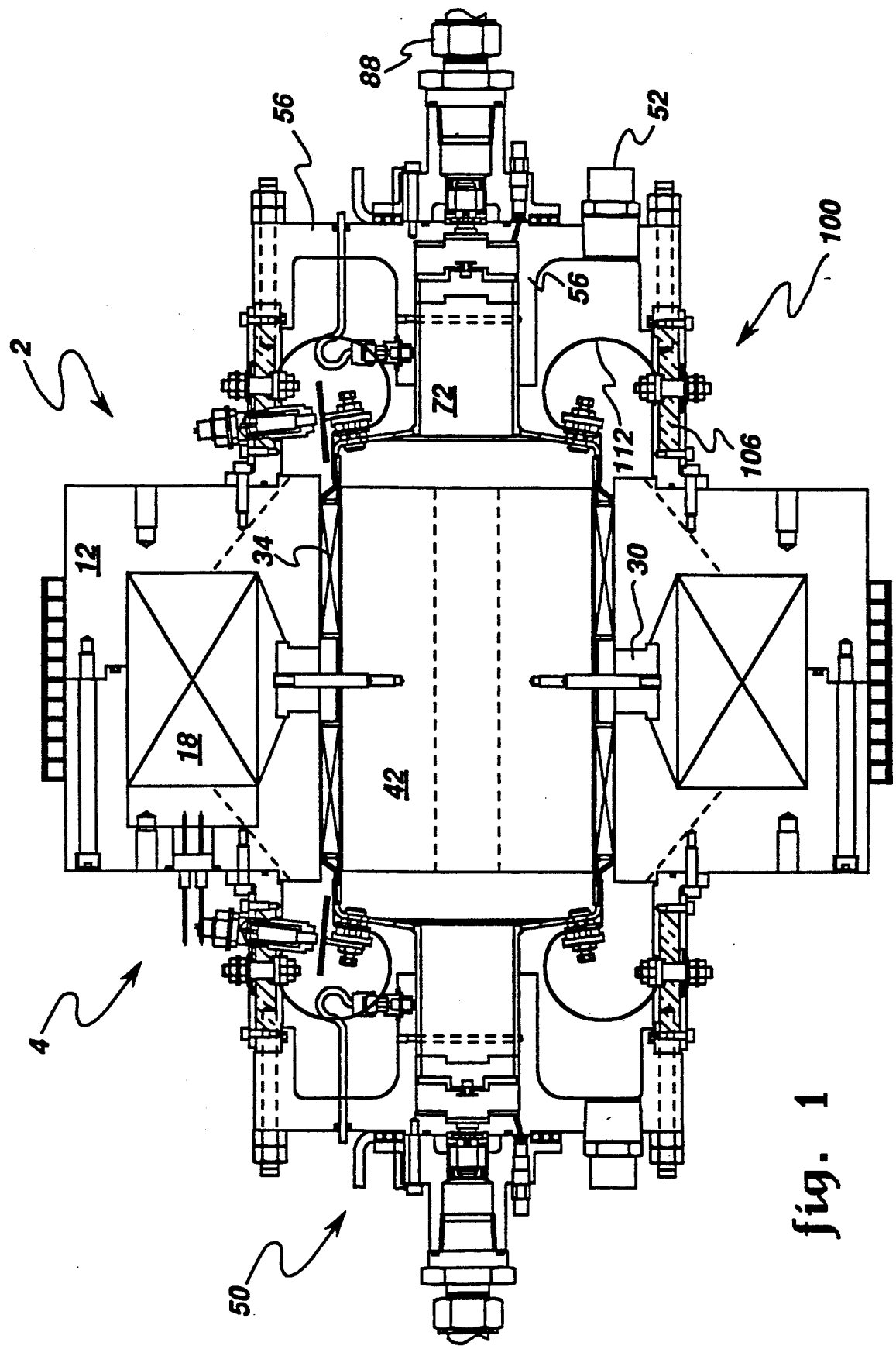
FIG. 1 is a side plan view of an oil-free linear motor compressor, according to the present invention.

With reference first to FIG. 1, there is illustrated oil-free linear motor compressor 2. Compressor 2, generally, includes, stator assembly 4, gas feed assembly 50 and driver assembly 100.

Figure 2:
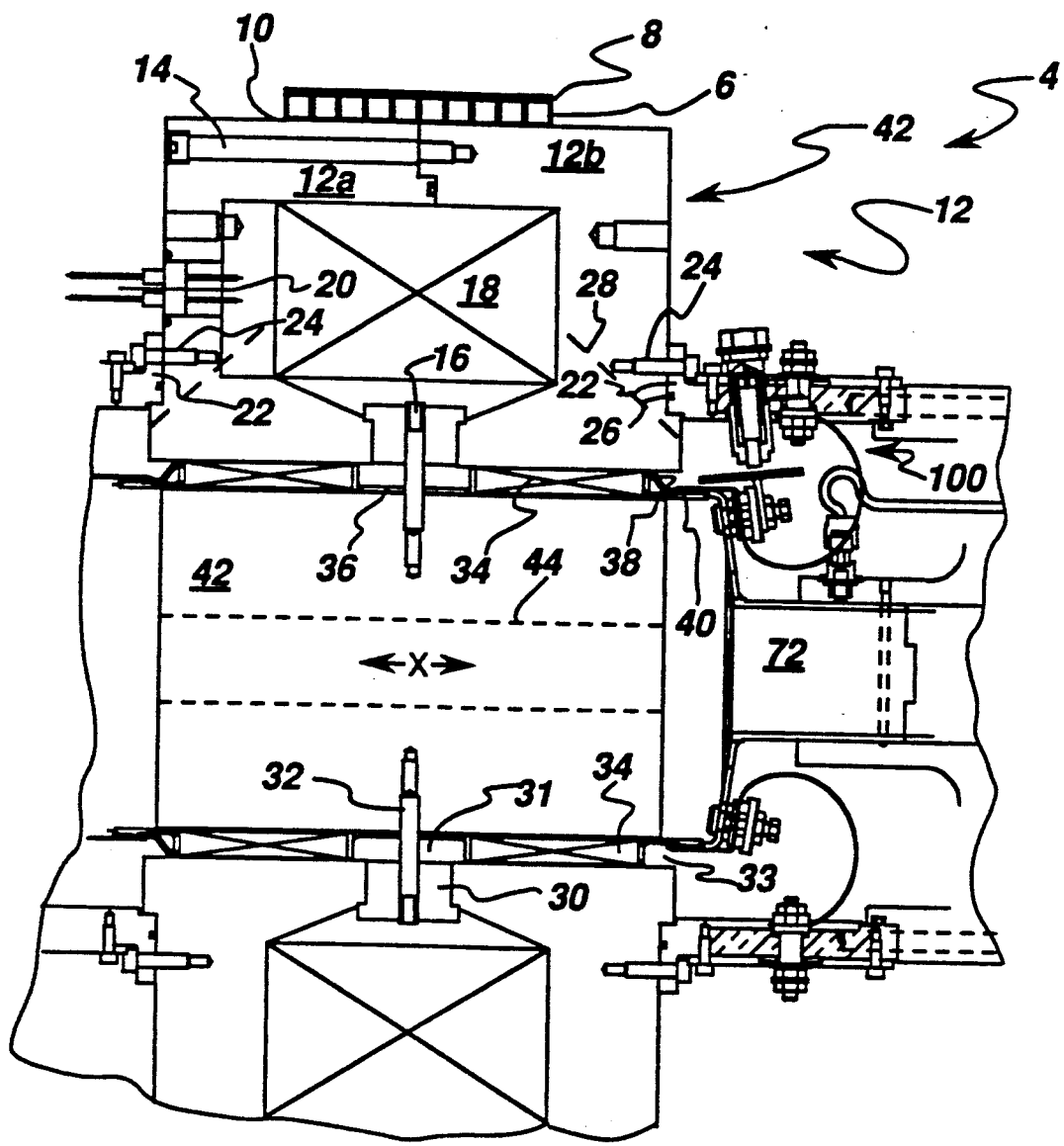
FIG. 2 is a detailed, side plan view of the stator, the inner core and the driver coil, according to the present invention.

As shown more clearly in FIG. 2, stator assembly 4 includes a conventional, water-cooled heat exchanger coil 6 which is secured to stator 12 by a band 8 that is located around the circumference of stator 12. Band 8 and stator 12, preferably, are constructed of steel. A conventional thermal grease is located between the contacting surfaces of heat exchanger 6 and stator 12 in order to assure proper heat exchange between stator 12 and heat exchanger 6. Preferably, stator 12 is constructed of two halves 12a and 12b. A conventional threaded fastener 14 is used to retain halves 12a and 12b together. Located within stator 12 is DC field coil 18. Coil 18, preferably, contains epoxy-impregnated copper wire which is wound by conventional winding techniques upon a stainless steel coil form (not shown). Coil 18 is rigidly retained in stator 12 by conventional fasteners 14. A conventional DC lead connection 20 is electrically connected to field coil 18.

Stator 12 is rigidly attached to bracket 22 by conventional fastener 24. Bracket 22, preferably, is constructed of stainless steel. A conventional elastomeric O-ring 26 is located between bracket 22 and stator 12 in order to substantially prevent leakage of gas inside stator 12. Diagonal sawcuts 28 are cut into stator 12 by conventional cutting techniques. Sawcuts 28 are used to break up the eddy current flow paths that are created by field coil 18 during operation of stator assembly 4. Typically, eddy currents create adverse electrical losses unless their flow path can be interrupted.

Also, located within stator 12 is alignment ring 30. Ring 30, preferably, is constructed of fiberglass. Ring 30 is rigidly held in stator 12 by rabbet fits 16. AC driver coils 34 are located on each side of ring 30. Coil 34, preferably, includes aluminum wires wound on a stainless steel coil form 31 by conventional winding techniques. Located along coil form 31 are slots 36. Slots 36 are machined on coil form 31 by conventional machining techniques to clear pins 32. Slots 36 allow coil form 31 to reciprocate along the direction of arrow X while stator assembly 4 is in operation.

Figure 4:
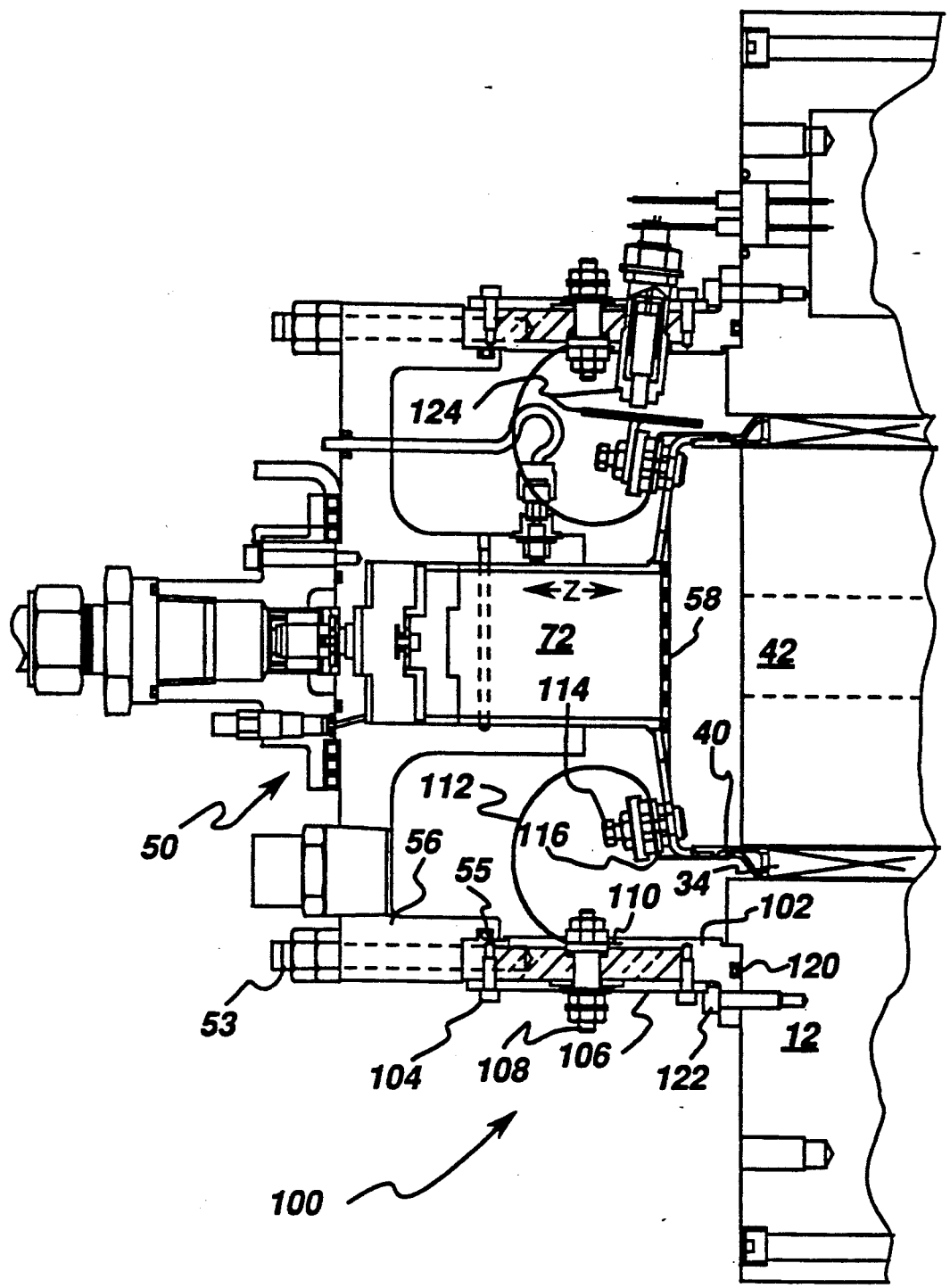
FIG. 4 is a detailed, side plan view of the driver coil spring, according to the present invention.

Extension 40 is part of coil form 31. Extension 40 is rigidly attached at the ends to drive assembly 100 which will be discussed later. A conventional electrical lead 38 is electrically attached to coil 34 and a spring lead 112 (FIG. 4). Located inside coils 34 is inner core 42. Core 42, preferably, is constructed of iron and is rigidly held in stator 12 by alignment pins 32. Horizontal sawcuts 44 are machined in core 42 by conventional machining techniques. Sawcuts 44 perform substantially the same function as sawcuts 28 in that sawcuts 44 break up the flow path of eddy currents created by coils 34 during their reciprocating motion inside stator assembly 4.

Figure 3:
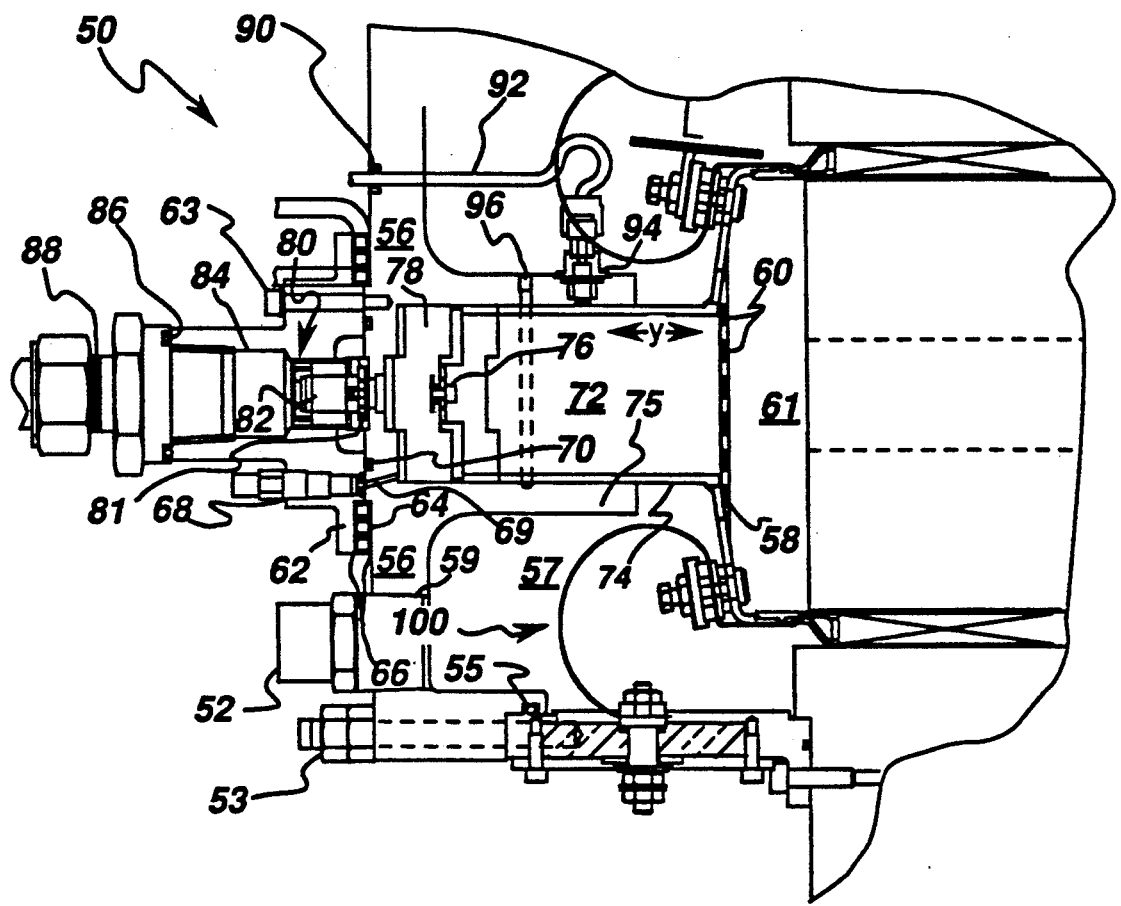
FIG. 3 is a detailed, side plan view of the piston, gas bearing and gas feed assemblies, according to the present invention.

FIG. 3 illustrates gas feed assembly 50. Assembly 50 includes, in part, conventional inlet 52, conventional outlet 88, conventional bearing inlet 90 and gas bearing outlet 96. Helium, preferably, is the gas used in assembly 50 and throughout compressor 2. Inlet 52 is rigidly attached to bracket 56 by a conventional fastener 59. Bracket 56, preferably, is constructed of stainless steel. Bracket 56 is rigidly attached to drive assembly 100 by conventional fasteners 53. A conventional elastomeric O-ring 55 is located between bracket 56 and drive assembly 100. O-ring 55 is used to prevent gas leakage from gas feed assembly 50.

Located adjacent to bracket 56 is chamber 57 into which the gas is fed from inlet 52. Plate 58 separates chambers 57 and 61. Plate 58 includes holes 60 which are formed in plate 58 by conventional techniques. Holes 60 allow the gas to flow from chamber 57 to chamber 61.

Bracket 62 is rigidly attached to bracket 56 by conventional fasteners 63. Bracket 62, preferably, is constructed of stainless steel. Located between brackets 62 and 56 is a conventional pancake-type, water-cooled heat exchanger 64. A conventional vacuum grease 66 is placed at the surfaces where heat exchanger 64 contacts brackets 56 and 62 in order to ensure low thermal contact resistance between brackets 56 and 62 and heat exchanger 64. A conventional pressure transducer 68 is rigidly retained in bracket 56. Transducer 68 contacts channel 69 in bracket 56 such that the compression pressure within chamber 78 can be accurately measured. A conventional elastomeric O-ring 70 is located between brackets 56 and 62 in order to prevent gas leakage from compression chamber 78.

Located within bracket 56 is hollow piston 72. Piston 72, preferably, is a thin-walled piston and is constructed of stainless steel. Piston 72 reciprocates along the direction of arrow Y for approximately 1 inch. Coating 74 is located on the circumference of piston 72. Coating 74, preferably is a Teflon ® non-stick coating which is placed on the outer circumference of piston by conventional coating techniques. The purpose of coating 74 is to substantially prevent adverse wear between piston 72 and cylinder 75 as piston 72 reciprocates and accidentally contacts cylinder 75. A conventional one-way diaphragm 76 is rigidly attached to one end of piston 72 by a conventional fastener. Diaphragm 76 prevents gas that has entered compression chamber 78 from re-entering back into piston 72.

Exhaust valve 80 is located adjacent to chamber 78 and is rigidly retained within bracket 62. Valve 80 includes a conventional valve 81 and a valve spring 82. Spring 82, preferably, is constructed of high strength carbon steel and acts to keep valve 81 in a closed position during the compression stroke of piston 72 until a desired pressure in compression chamber 78 overcomes the spring force of spring 82 and causes valve 81 to open and the gas to escape out of outlet 88. Outlet 88 is rigidly attached to exhaust valve 80 by extension 84. A conventional elastomeric O-ring 86 located on extension 84 prevents gas from leaking from compressor 2 around bracket 62.

Gas bearing inlet 90 is located adjacent to outlet 88. Preferably, there are four gas bearing inlets 90 which feed gas to the four gas bearing orifices 94. Helium, preferably, is used as the gas for bearing orifice 94. A conventional gas feed tube 92 connects inlet 90 and bearing orifice 94. As gas is fed through inlet 90 and tube 92, the gas expands through orifice 94 to form a jet that impinges on piston 72 at four locations which are located at approximately 90° from each other around the circumference of piston 72. In this manner, the force of the gas jets against piston 72 acts as a lubricant for piston 72 as piston 72 reciprocates. This use of the gas allows one to avoid the deleterious effects of petroleum-based oils as discussed earlier while still allowing piston 72 to freely reciprocate. Outlet 96 is located adjacent to bearing orifice 94. Outlet 96 allows some of the gas to escape. It is to be noted that gas can either escape through outlet 96 or through the gap between piston 72 and cylinder 75 into chamber 57.

As shown in FIG. 4, located adjacent to gas feed assembly 50 is drive assembly 100. Drive assembly 100 includes, in part, spring lead 112 and driver coil 34. Located within drive assembly 100 are bracket 102 and window 106. Bracket 102, preferably, is constructed of stainless steel. Window 106 preferably, is constructed of any suitable transparent material and is fastened to bracket 106 by conventional fasteners 104.

Located on window 106 is a conventional AC connection 108. Connection 108 includes a conventional AC connector 110 which is electrically attached to spring lead 112. Spring lead 112, preferably, is constructed of the same high strength carbon steel material as spring 82 (FIG. 3). One end of lead 112 flexes about one inch in the direction of arrow Z which is about one inch. It is noted that the distance (Z) that lead 112 flexes should equal the distance (Y) in which piston 72 reciprocates. Lead 112 is rigidly held by one end with connector 108 and at the other end by a conventional fasteners 114. Fastener 114 includes AC connector 116 which is electrically connected to spring 112. Fastener 114 also rigidly connects the one end of spring 112 to plate 58. Plate 58 is rigidly attached to extension 40 by a conventional weldment.

Bracket 102 is rigidly attached to stator 12 by a conventional fastener 122. A conventional elastomeric O-ring 120 is located between bracket 102 and stator 12 in order to prevent gas leakage near bracket 102. Located adjacent to spring 112 is a conventional displacer sensor 124.

In operation of compressor 2, gas is fed into inlet 52 (FIG. 3) by a conventional feed source (not shown) such that the inlet pressure is approximately 75 psi. At this same time stator 12 and coil 34 (FIG. 2) are operating to cause coil 34 to reciprocate along the direction of arrow X. The reciprocation of coil 34 is transferred from coil 34 to spring 112 (FIG. 4) and piston 72 via plate 58 and fastener 114. It is to be noted that coil 34, preferably, reciprocates at a rate of approximately 60 Hz.

As piston 72 is reciprocating, gas goes into chamber 57 (FIG. 3). The gas enters chamber 61 (FIg. 3) and is passed through holes 60 in plate 58. The gas enters through hollow piston 72. As piston 72 reciprocates towards chamber 61 along the one direction of arrow Y, gas enters compression chamber 78 through diaphragm 76. As piston 72 reciprocates towards exhaust valve 80 along the other direction of arrow Y, the pressure of the gas can rise up to 300 psi and reach temperatures exceeding 500° F. The high pressure, high temperature gas then is exhausted out of compression chamber 78 by exhaust valve 80. As piston 72 reaches the end of the stroke inside cylinder head 75, a trapped volume of gas is formed to act as a gas spring and assist in the return of piston 72.

While piston 72 is compressing the gas, gas is fed by gas bearing inlet 90 into gas bearing orifices 94 such that bearing orifices 94 provide support for piston 72 to keep piston 72 from rubbing against cylinder 75. The gas from bearing orifices 94 can either escape through outlet 96 or through the gap between piston 72 and cylinder 75 into chamber 57 to be compressed.

In order to detect the proper motion of coil 34, piston 72 and spring 112, windows 106 and displacer sensor 124 are used. The operator can merely look through window 106 to determine if the various elements are reciprocating or flexing. Also, the operator can shine a conventional timing instrument, such as a strobe light to accurately measure the reciprocation rate. Finally, the operator can observe measurements from sensor 124 on a conventional display (not shown) in order to determine the reciprocation rate of piston 72. The procedure is designed to be continuous for approximately $10^{10}$ cycles or approximately 5 years of operation at 60 Hz.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An oil-free linear motor compressor which is comprised of:
   a stator means;
   an inner core means substantially located within said stator means;
   a reciprocating driver coil means substantially located between said stator means and said inner core means;
   a compressor drive means located adjacent to said inner core means and attached to said driver coil means, wherein said compressor drive means comprises a reciprocation and flexure detection means located adjacent to said compressor drive means; and a pressure detection means located adjacent to said compressor drive means, wherein said reciprocation and flexure detection means comprises a window means; and a displacement sensor means; and
   a gas inlet and exhaust means substantially connected to said compressor drive means.

2. The compressor, according to claim 1, wherein said stator means is further comprised of:
   a DC field coil.

3. The compressor, according to claim 1, wherein said inner core is further comprised of:
   an alignment ring located substantially between said stator and said core; and
   alignment pins rigidly attaching said alignment ring to said inner core.

4. The compressor, according to claim 1, wherein said reciprocating drive means is further comprised of:
   an AC driver coil.

5. The compressor, according to claim 4, wherein said driver coil is further comprised of:
   slots substantially located on said driver coil to clear said alignment pins.

6. The compressor, according to claim 1, wherein said compressor drive means is further comprised of:
   a reciprocating piston means.

7. The compressor, according to claim 6, wherein said piston means is further comprised of:
   a hollow, thin-walled piston; and
   a diaphragm located adjacent one end of said piston means.

8. The compressor, according to claim 1, wherein said gas inlet and exhaust means is further comprised of:
   a gas feed inlet;
   a gas feed exhaust located away from said gas feed inlet;
   a gas bearing inlet means located adjacent said gas feed exhaust;
   a gas bearing means located adjacent said compressor drive means; and
   a gas bearing exhaust means located adjacent to said gas bearing means.

9. The compressor, according to claim 8, wherein said gas bearing means is further comprised of:
   at least four gas bearing located approximately 90° from each other around a circumference of said compressor drive means.

10. The compressor, according to claim 8, wherein said gas bearing exhaust means is further comprised of:
    a groove.

11. The compressor, according to claim 8, wherein said gas feed exhaust means is further comprised of:
    an exhaust valve means located adjacent to said compressor drive means; and
    a valve spring means located adjacent to said exhaust valve means.

12. The compressor, according to claim 1, wherein said pressure detection means is further comprised of:
    a pressure transducer.

13. A method for compressing gas with an oil-free linear compressor having a stator means, a driver coil means, a compressor drive means having a spring lead, a reciprocation and flexure detection means having a window and a displacement sensor means, a pressure detection means and a gas inlet and exhaust means, wherein said method is comprised of the steps of:
    operating said stator means and said driver coil means;
    reciprocating said driver coil means;

introducing gas into said compressor drive means by said gas inlet means;
reciprocating said compressor drive means and flexing said spring lead;
maintaining said compressor drive means in a predetermined axial reciprocation direction by said gas inlet and exhaust means;
compressing said gas;
detecting a pressure of said gas with said pressure detection means;
exhausting said compressed gas through said gas exhaust means;
detecting the reciprocation of said driver coil means and said compressor drive means with said reciprocation and flexure detection means; and
detecting the flexing of said spring lead with said reciprocation and flexure detection means.

14. The method, according to claim 13, wherein said step of introducing gas into said compressor drive means is further comprised of the step of:
introducing gas at approximately 75 psi.

15. The method, according to claim 13, wherein said step of reciprocating said driver coil means is further comprised of the step of:
reciprocating at approximately 60 Hz.

16. The method, according to claim 13, wherein said step of compressing said gas is further comprised of the step of:
compressing said gas to approximately 300 psi and to a temperature of at least 500° F.

17. The method, according to claim 13, wherein said gas is further comprised of:
helium.

18. The method, according to claim 13, wherein said compressor drive means is further comprised of:
a piston means coated around an outer circumference with a non-stick coating.

* * * * *